Patented Dec. 8, 1925.

1,564,890

UNITED STATES PATENT OFFICE.

ALEXIS D. PARKER, OF VILLANOVA, PENNSYLVANIA, ASSIGNOR TO AMERICAN BRIQUET COMPANY, A CORPORATION OF DELAWARE.

BRIQUETTE.

No Drawing. Application filed January 8, 1925. Serial No. 1,169.

*To all whom it may concern:*

Be it known that I, ALEXIS D. PARKER, a citizen of the United States, residing at Villanova, in the county of Delaware, State of Pennsylvania, have invented a new and useful Briquette, of which the following is a specification.

My invention relates to improvements in briquettes and the method of manufacturing same.

The invention comprises improvements in the binder and in the method of forming the same whereby briquettes of good quality may be made at low cost.

The invention relates to that type of briquette which is formed with a binder comprising starch or other amylaceous material or carbohydrate substance, and asphalt or reduced petroleum or other similar hydro-carbon substance which is solid at ordinary temperatures.

The purpose of the present invention is to reduce the amount of starch per ton heretofore required by increasing the efficiency of the reduced amount especially with respect to its adhesive or similar adherent characteristics.

This I accomplish by adding to the water in which the starch is mixed, a relatively small quantity of borax or other more or less equivalent or similar alkali. I have found that, by dissolving a small portion of such alkali with the water which is mixed with the starch, the starch granules burst much more readily and much more thoroughly so that the adhesive or binding effect of the emulsion of which the starch forms an ingredient is very materially increased. By this process a relatively much smaller quantity of starch is required than it has heretofore been customary to use.

The following is an example of the method of forming the emulsion and of employing the same in the manufacture of briquettes of slack, coal dust, anthracite culm, or similar substance.

The material is usually made up in batches sufficient for from six to eight tons. In preparing the emulsion for such a batch, about sixty pounds of starch, and about six pounds of borax are mixed together with about twenty-five gallons, or two hundred pounds of water. These proportions are only approximate. Some variation is permissible under differing conditions.

To this mixture is then added about fifteen hundred and eighty pounds of water, which is then brought to a high boiling point. To this mixture is then added about four hundred pounds of asphaltum, melted asphaltic pitch, the residuum from the distillation of petroleum, or in other words, a hydro-carbon substance which is solid at ordinary temperature.

This asphaltum is thoroughly beaten into the said paste by suitable mechanical beaters. This action causes a breaking up of the hot asphalt into minute particles which are distributed through the starch paste producing a very smooth chemical emulsion.

This emulsion is now mixed with dry coal dust, such as anthracite culm, or other powdered or granulated material. The thorough mixing of coal dust and emulsion is preferably accomplished by means of a system of paddles and scrapers.

The resultant plastic mass is then conveyed to a press to be compressed into briquettes. The briquettes are then subjected to a suitable drying process as for example:

From the press the briquettes are conveyed to a drying oven where the moisture incorporated with the material through the emulsion is substantially removed.

By the present method the quantity of starch per ton of coal dust is reduced about 58% of that formerly used in a somewhat similar process. This is due to the peculiar chemical action of the borax or other similar alkali upon the starch granules. The finished briquette is much harder and capable of standing very rough handling, and its burning and heat giving qualities are improved.

What I claim is:—

1. The method which consists in mixing starch with borax in water, then adding thereto a relatively large quantity of water and bringing the same to high boiling point, then adding and stirring therewith hot asphaltum to form an emulsion, and then mixing the emulsion with culm or the like and forming the same into briquettes and drying the same.

2. A briquette formed of powdered coal mixed with an emulsion formed approximately of the following proportions per ton of coal, one-third of one per cent starch, one-thirtieth of one per cent borax, three per cent asphalt.

3. A briquette formed of powdered coal mixed with an emulsion formed approximately of the following proportions per ton of coal, one-third of one per cent starch, one-thirtieth of one per cent borax, and three per cent asphalt, compressed into form and dried.

ALEXIS D. PARKER.